United States Patent
Poubel Orenstein et al.

(10) Patent No.: US 11,702,106 B1
(45) Date of Patent: Jul. 18, 2023

(54) TUNING A SAFETY SYSTEM BASED ON NEAR-MISS EVENTS

(71) Applicant: Zoox, Inc., Foster City, CA (US)

(72) Inventors: Leonardo Poubel Orenstein, San Mateo, CA (US); Lingqiao Qin, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 247 days.

(21) Appl. No.: 16/953,277

(22) Filed: Nov. 19, 2020

(51) Int. Cl.
*B60W 60/00* (2020.01)
*G05D 1/00* (2006.01)
*G05D 1/02* (2020.01)
*B60W 30/09* (2012.01)
*B60W 50/00* (2006.01)
*B60W 30/095* (2012.01)

(52) U.S. Cl.
CPC ........ *B60W 60/0015* (2020.02); *B60W 30/09* (2013.01); *B60W 30/0956* (2013.01); *B60W 50/0097* (2013.01); *G05D 1/0088* (2013.01); *G05D 1/0214* (2013.01); *G05D 1/0221* (2013.01); *B60W 2554/801* (2020.02); *B60W 2554/804* (2020.02); *G05D 2201/0213* (2013.01)

(58) Field of Classification Search
CPC ............. B60W 60/0015; B60W 30/09; B60W 30/0956; B60W 50/0097; B60W 2554/804; B60W 2554/801; G05D 1/0088; G05D 1/0214; G05D 1/0221; G05D 2201/0213
See application file for complete search history.

(56) References Cited

U.S. PATENT DOCUMENTS

| | | | |
|---|---|---|---|
| 2004/0153244 A1* | 8/2004 | Kellum | G08G 1/161 340/436 |
| 2005/0179580 A1* | 8/2005 | Cong | G01S 13/723 342/107 |
| 2015/0375743 A1* | 12/2015 | Izuhara | B60W 30/08 701/36 |
| 2017/0101093 A1* | 4/2017 | Barfield, Jr. | G08G 1/09675 |
| 2017/0113683 A1* | 4/2017 | Mudalige | B60W 30/18145 |
| 2017/0193384 A1* | 7/2017 | Mudalige | G08G 1/161 |
| 2017/0297586 A1* | 10/2017 | Li | G05D 1/0088 |
| 2018/0276485 A1* | 9/2018 | Heck | G01C 21/3461 |
| 2018/0284245 A1* | 10/2018 | LaChapelle | G01S 7/4861 |

* cited by examiner

*Primary Examiner* — Behrang Badii
*Assistant Examiner* — Matthew J. Reda
(74) *Attorney, Agent, or Firm* — Lee & Hayes, P.C.

(57) ABSTRACT

An autonomous vehicle safety system may activate to prevent collisions by detecting that a planned trajectory may result in a collision. If the safety system is overly sensitive, it may cause false positive activations, and if the system isn't sensitive enough the collision avoidance system may not activate and prevent a collision, which is unacceptable. It may be impossible or prohibitively difficult to detect false positive activations of a safety system and it is unacceptable to risk a false negative, so tuning the safety system is notoriously difficult. Tuning the safety system may include detecting near-miss events using surrogate metrics, and tuning the safety system to increase or decrease a rate of near-miss events as a stand-in for false positives.

18 Claims, 5 Drawing Sheets

TUNING A SAFETY SYSTEM BASED ON NEAR-MISS EVENTS

BACKGROUND

Safety of passengers in a vehicle and other people or objects in proximity to the vehicle is of the upmost importance. Such safety is often predicated on an accurate detection of a potential collision and timely deployment of a safety measure. To safely operate, an autonomous vehicle may include a backup system that may cause the autonomous vehicle to execute an emergency maneuver, such as a hard-braking, in situations that the backup system detects as likely resulting in a collision. However, if the backup system engages when there was no reason for the backup system to execute an emergency maneuver (i.e., a false positive detection on the part of the backup system), the backup system may put the autonomous vehicle in a situation that may be just as dangerous as failing to enact the backup system in a true emergency.

BRIEF DESCRIPTION OF THE DRAWINGS

The detailed description is described with reference to the accompanying figures.

In the figures, the left-most digit(s) of a reference number identify the figure in which the reference number first appears. The same reference numbers in different figures indicate similar or identical items.

DETAILED DESCRIPTION

Figure 1:
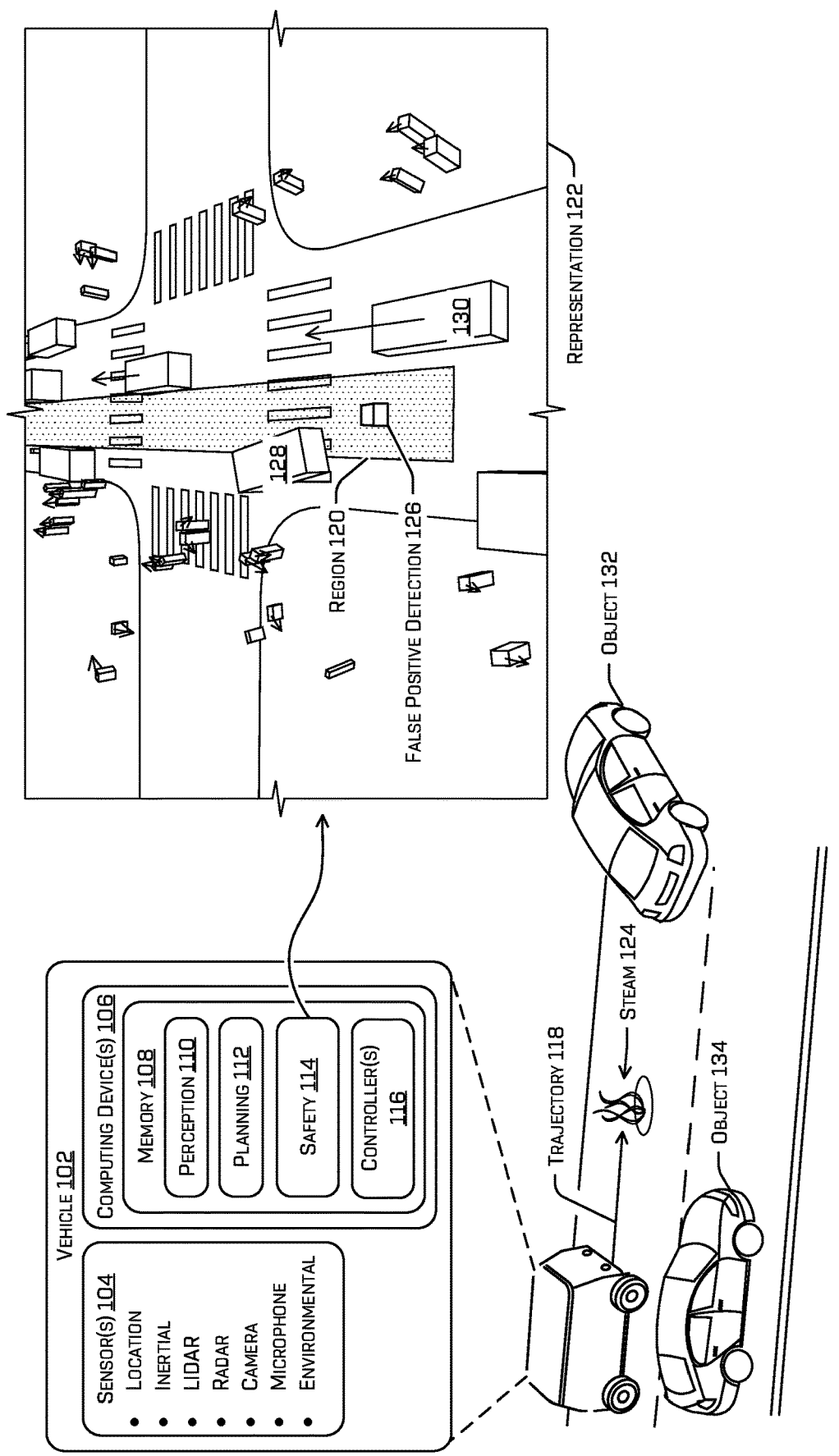
FIG. 1 illustrates an example scenario in which an autonomous vehicle configured with a safety component may generate a trajectory for controlling the autonomous vehicle and determine, by the safety component, whether to implement the trajectory or cause the autonomous vehicle to perform a contingent trajectory, such as a safe stop, braking, or hard braking.

Techniques for collision avoidance may comprise a safety system that validates, rejects, or replaces a trajectory generated by a planning component for controlling a vehicle. For example, upon validating a trajectory according to the techniques discussed herein, the safety system may pass or otherwise allow the trajectory to be implemented by the vehicle. However, upon determining that the trajectory is invalid, such as by detecting an object that impedes the trajectory, the safety system may cause the vehicle to initiate an alternative maneuver (e.g., a safe stop maneuver, a contingent trajectory), modify the trajectory, and/or re-determine a new trajectory, collectively referred to herein as activation of the safety component. In some examples, a planning component of the vehicle may determine the trajectory based at least in part on sensor data, map data, and/or perception data (e.g., what is in the environment, characteristics of objects in the environment, where the autonomous vehicle is/how the autonomous vehicle is oriented relative to objects in the environment, mapped locations, and/or the like) received from a primary perception component.

The safety system may comprise a secondary perception component and/or validation component. For example, the safety system may receive the trajectory and receive, from one or more sensors, sensor data associated with an environment surrounding the autonomous vehicle. In some examples, while the primary perception component may determine the perception data based at least in part on all or near all of the sensor data, the secondary perception component of the safety system may determine whether or not to reject the trajectory based at least in part on a subset of the sensor data used by the primary perception component.

The techniques discussed herein may decrease the rate of false positive activations of the safety system. A false positive activation of the safety component may include a situation where an originally-planned trajectory would not have resulted in a collision, but the safety component triggered an alternate maneuver anyway. For example, such situations may include examples where the safety component incorrectly predicted a trajectory of an object or detected an ephemeral object, such as a plastic bag, steam, shadow, or the like as being an object with which the autonomous vehicle will collide if an alternate maneuver is not executed. In many cases, false positive activations of the safety system may be of little consequence but also in some circumstances they may be as dangerous as a false negative event (e.g., failure to activate). Additionally, it may be difficult or impossible to identify false positive activations of the safety component.

A false negative event may include a situation where the safety system fails to detect or inaccurately detects an object or scenario in which the safety system should have been activated. For example, a false negative event may comprise the secondary perception system of the safety system determining that an object occupies a smaller space than the object actually occupies, causing the vehicle and the object to nearly collide. A near-collision may include the vehicle passing within a threshold distance of an object. Since no collision may result from such a failure of the safety system or other component and since the safety system may not activate in such a situation, the situation may not be flagged or otherwise raise an alert that identifies the safety system or other component as needing alteration. It may be difficult or impossible to identify such situations without a manual review of hundreds or thousands of hours of sensor data by a human and, even then, a human may miss or not be able to identify a fleeting false positive (e.g., where the safety system momentarily or partially caused an alternate maneuver) or a de minimis false negative where another object got closer to the vehicle than a distance threshold. Hence, the opportunity to correct the safety system or other component may be lost, which may perpetuate false positives or undetected false negatives. Moreover, intentionally operating the autonomous vehicle to create situations in which false positives or false negatives occur for the sake of observation and testing may unnecessarily create risk.

False positive activations may be caused by oversensitivity of the safety system, an inaccuracy or mis-training of the secondary perception component of the safety system, and/or an inaccuracy of other component(s) that provide input to the safety system, such as a trajectory that was generated based on inaccurate perception data or an inaccuracy of the planning component itself that caused the trajectory to be skewed or otherwise flawed. The rate at which the safety system generates false positive activations may be further aggravated by the safety system being configured to prevent any false negatives—situations in which the safety system fails to detect an object that exists, potentially resulting in a collision. In an attempt to avoid any false negatives, the safety system may be overly sensitive, eliminating false negatives but introducing an unacceptable amount of false positives.

Manually decreasing the sensitivity of the safety system to avoid generating false positives may be untenable since this may inadvertently cause the configuration of the safety system to generate a false negative by making the system too insensitive or otherwise adjusting such thresholds arbitrarily without adequate data-based decision-making. Moreover, limited or no data may exist associated with actual collisions since the safety system is designed to prevent all collisions, which prevents any opportunity to train or otherwise tune the safety system or other components of the autonomous vehicle as discussed above. Without any data regarding collisions, it may be difficult or impossible to tune the parameters of the safety system without risking the creation of false negatives.

The techniques discussed herein comprise detecting log data associated with near-collision events (also referred to as "near misses") and using that log data to tune the safety system. The log data may comprise sensor data; determination(s) made by the safety system, such as whether to validate a trajectory or activate an alternate maneuver; perception data generated by a perception component of the autonomous vehicle; trajectories and/or other data generated by a planning component of the autonomous vehicle, and/or any other data collected or generated by an autonomous vehicle.

In some examples, detecting a near-collision event may comprise determining one or more surrogate metrics associated with a portion of log data (e.g., metrics derived from log data and used to "stand in" for (or, otherwise, be representative of) those events of near-misses, or the like, since they're so hard to detect). As such, such metrics may be referred to herein as surrogate metrics, representative metrics, or, generally, characteristics associated with operation of the vehicle. In some examples, identifying a portion of the log data that may be associated with a near-collision event may be based at least in part on a rule set for filtering the log data. The rule set my identify log data and/or surrogate metric(s) indicative of an imminent risk to the autonomous vehicle or an object associated with the autonomous vehicle being at risk (e.g., using a threshold distance, a pose, path, and/or velocity of the vehicle or object) and/or that action may have been necessary to avoid collision. By tuning parameter(s) of the safety system or another component of the autonomous vehicle to conform to an upper threshold and/or lower threshold for a near-collision event rate, the false positive rate of activations of the safety system may be reduced without introducing any false negatives.

In other words, since false positives are so difficult to detect, the techniques include tuning parameter(s) of component(s) of the autonomous vehicle by detecting near-collisions using surrogate metric ruleset filtering such that the near-miss rate would be increased or decreased. An increase in the near-collision rate may be associated with a decrease in false positives and a decrease in the near-collision rate may be associated with an increase in false positives. The techniques may additionally or alternatively comprise determining an upper bound on the near-collision rate and a lower bound for the near-collision rate as a surrogate for false positive bounds. For example, the bounds may be determined based at least in part on an upper limit on a number of near-misses per mile and a lower limit on a number of near-misses per mile.

Note that permitting a lower threshold of near-collision events may be useful for navigating in dense urban environments where it may be impossible to navigate without at least some events that technically qualify as near collision events. Plus, completely eliminating false positives (by increasing the near-miss rate) may be less safe than permitting some near-misses. In some examples, the lower threshold or parameter(s) of the safety system generated using the lower threshold may be toggled on/off based at least in part on detecting a type of environment (e.g., dense urban environment, presence of erratic agent(s)). Moreover, near-collision events may be permitted since near-collisions involve other objects, over which no control is exercised and data about which may be limited.

The techniques may additionally or alternatively comprise determining a component for modification based at least in part on data associated with a near-collision event. For example, the techniques may comprise substituting the secondary perception component of the safety system with a perfect perception component (e.g., by using ground truth data or by using a component that uses hardware or algorithms that might not be available on-vehicle, due to computation time, computational availability/hardware, and/or storage constraints) or the primary perception component and re-running the relevant part of the log data (e.g., sensor data, trajectory generated by planning component) through the safety component to determine whether the safety component would behave in the same way again or whether the replacement would cause the safety component to perform differently. In at least some examples, the secondary perception component may be more rudimentary or limited than the primary perception component. In additional or alternate examples, other component(s) of the vehicle control pipeline may be replaced, such as the primary perception component, a localization component or other sub-components of the primary perception component, the planning component, or the like. If the behavior of the safety system changes because of replacement of a component of the safety component for a more accurate (but potentially more computationally expensive) component, the safety system may be penalized or otherwise modified.

The techniques may additionally or alternatively comprise discriminating between an error or inaccuracy of the safety component and an error or inaccuracy of another component of the vehicle control pipeline. Determining that another component should be penalized or modified may comprise replacing any other component of the autonomous vehicle with a more accurate version of that component (e.g., a perfect version, such as ground truth labeled data or a component that may be too computationally expensive to currently be implemented on-vehicle), re-running the sensor data and/or other relevant log data through the pipeline, and determining whether a new trajectory generated by the planning component and/or new perception data (e.g., estimated position and/or orientation of the vehicle, distance from another object) is sufficiently different from the original trajectory and/or perception data indicated in the log data. Determining that the trajectory and/or perception data is sufficiently different may vary depending on the data type, but may comprise determining a difference between the original data and the new data and determining whether that difference meets or exceeds a threshold difference. For example, determining the new trajectory is sufficiently different than the original trajectory may comprise determining that a difference between a position, velocity, steering angle, or the like between the new trajectory and the original trajectory meets or exceeds a threshold position, velocity, steering angle, or the like. In some examples, determining that the new trajectory is sufficiently different may comprise determining whether the new trajectory fails to result in a near-collision, whereas the former trajectory resulted in a near-collision.

If the new trajectory and/or perception data is sufficiently different than the original trajectory and/or perception data, the component(s) that were replaced may be modified and/or, in some cases, the safety system may not be penalized even though the safety system may have been activated/not activated for a near collision. However, in some examples, the safety system may also be modified.

The techniques discussed herein may improve the safety of a vehicle by reducing the false positive rate of the safety system, without introducing false negatives. In at least some examples, such techniques may further prevent collisions or near-collisions. The techniques may also improve the accuracy of components in the trajectory generation pipeline (perception, prediction, planning, etc.) and/or the secondary perception system of the safety system or other components thereof. The accuracy of the safety system may also be higher than an accuracy of the primary perception system, thereby reducing an overall error rate of trajectories implemented by the autonomous vehicle by filtering out invalid trajectories.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, a safety component 114, and/or system controller(s) 116. Although depicted in FIG. 1 for illustrative purposes, it should be understood that the safety component 114 may reside in/on a separate computing device (or otherwise) than any one or more of the other components. In some examples, the perception component 110 may be a primary perception component among other perception components, such as a secondary perception component that may be part of safety component 114. In general, the perception component 110 may determine what is in the environment surrounding the vehicle 102 and/or predictions of the state of the environment and object(s) therein in the future and the planning component 112 may determine how to operate the vehicle 102 according to information received from the perception component 110. For example, the planning component 112 may determine trajectory 118 based at least in part on the perception data and/or other information such as, for example, one or more maps, localization information (e.g., where the vehicle 102 is in the environment relative to a map and/or features detected by the perception component 110), and/or the like.

The trajectory 118 may comprise instructions for controller(s) 116 to actuate drive components of the vehicle 102 to effectuate a steering angle and/or steering rate, which may result in a vehicle position, vehicle velocity, and/or vehicle acceleration. For example, the trajectory 118 may comprise a target heading, target steering angle, target steering rate, target position, target velocity, and/or target acceleration for the controller(s) 116 to track. The perception component 110, the planning component 112, and/or the safety component 114 may include one or more machine-learned (ML) models and/or other computer-executable instructions.

In some examples, the perception component 110 may receive sensor data from the sensor(s) 104 and determine data related to objects in the vicinity of the vehicle 102, such as, for example, classifications associated with detected objects, instance segmentation(s), semantic segmentation(s), two and/or three-dimensional bounding boxes, tracks, and/or the like; route data that specifies a destination of the vehicle; global map data that identifies characteristics of roadways (e.g., features detectable in different sensor modalities useful for localizing the autonomous vehicle); local map data that identifies characteristics detected in proximity to the vehicle (e.g., locations and/or dimensions of buildings, trees, fences, fire hydrants, stop signs, and any other feature detectable in various sensor modalities), etc. The object classifications determined by the perception component 110 may distinguish between different object types such as, for example, a passenger vehicle, a pedestrian, a bicyclist, a delivery truck, a semi-truck, traffic signage, and/or the like. A track may comprise a historical, current, and/or predicted object pose (e.g., position and/or orientation), velocity, and/or acceleration, etc. The data produced by the perception component 110 may be collectively referred to as perception data. Once the perception component 110 has generated perception data, the perception component 110 may provide the perception data to the planning component 112.

The planning component 112 may use the perception data received from perception component 110, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 118 of the vehicle 102 that may be used to generate a drive control signal that may be transmitted to drive components of the vehicle 102. FIG. 1 depicts an example of such a trajectory 118, represented as an arrow indicating a heading, velocity, and/or acceleration, although the trajectory itself may comprise instructions for controller(s) 116, which may, in turn, actuate a drive system of the vehicle 102.

In some examples, the perception component 110 and/or planning component 112 may be at least part of a pipeline of hardware and/or software, which may include the sensor(s) 104, one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise LIDAR and/or radar data, which the perception component 110 may receive as input. The perception component 110 may be configured to detect as many objects and information about the environment as possible to avoid failing to account for an event or object behavior that should be accounted for by the planning component 112 in determining the trajectory 118.

By contrast, the safety component 114 may monitor a region 120 that may be less than the entire region within an effective range of the sensor(s) 104, although in at least one example, the safety component 114 may monitor the entire region of the effective range of the sensor(s) 104 including region 120 and well beyond. The safety component 114 may determine a subset of the sensor data associated with the region 120 and conduct the operations discussed herein based at least in part on the subset. For example, in the example scenario, the safety component 114 may determine a subset that comprises sensor data that includes the portion of the environment indicated by region 120, which may comprise a part of the representation 122. Although, in additional or alternate examples, the safety component 114 may monitor the same region as the perception component 110. In at least some examples, the region may be based on one or more of kinematics or maximum operating parameters of the vehicle (a maximum braking distance, minimum radius of curvature, etc.).

Safety component 114 may monitor sensor data associated with the region 120 to ensure the trajectory 118 will not or is not likely to result in a collision. In some examples, this may comprise receiving sensor data and generating a top-down representation of the environment and the objects therein, as discussed in more detail in U.S. patent application Ser. No. 16/588,529, filed Sep. 30, 2019 and incorporated in its entirety herein. The safety component 114 may comprise a secondary perception component that generates a top-down representation of the environment and classify portions thereof as being occupied or unoccupied in at least one example. In some examples, the safety component 114 may additionally or alternatively determine whether an occupied portion is dynamic or static.

The safety component 114 may additionally or alternatively comprise a validation component that may determine a threshold distance (defining how close trajectories may be to objects detected by the secondary perception component) and/or determine whether to validate or reject the trajectory 118. Validating the trajectory 118 may comprise transmitting the trajectory 118 to the controller(s) 116 (e.g., the validation component may comprise a multiplexer, one or more transistors configured as a switch that passes the trajectory 118 upon receiving a signal from the validation component, and/or the like that may provide a signal that allows the trajectory 118 signal to pass to the controller(s) 116). Rejecting the trajectory 118 may comprise transmitting a message to the planning component 112 to initiate modifying the trajectory, selecting a contingent trajectory, re-determining a trajectory and/or initiating an alternate maneuver, such as a safe stop maneuver (e.g., emergency braking, pull over and park) and/or a contingent trajectory that may be received from the planning component 112 in addition to the trajectory 118 and/or stored in the memory 108. In some examples, the collision avoidance 114 may determine that at least a portion of the subset of the sensor data is valid or invalid based at least in part on an orientation of the sensors and/or a topology of the environment and/or a lower and upper bound of a valid portion of the sensor data, as discussed in more detail herein.

The illustrated example demonstrates a scenario in which the safety component 114 may activate, preventing trajectory 118 from being implemented, due to a false positive detection by the secondary perception component of the safety component 114 or the primary perception component 110. For example, the secondary and/or primary perception component may classify steam 124 issuing from a manhole cover as a solid object. This false positive detection 126 of the steam 124 is represented as a box in the representation 122, along with detection 128 and 130, which may be true positive detections corresponding with object 132 and 134, respectively. Prediction(s) generated by a prediction component of the perception component 110 may also be associated with false positives, such as when a trajectory associated with a vehicle or pedestrian is incorrect.

Techniques for identifying which component generated the error and/or should be modified are discussed herein. Note that the type of error depicted in FIG. 1 is a false positive detection of the existence of an object, although the error may additionally or alternatively comprise incorrectly determined dimensions, classification, velocity, or the like of an object. For example, even if the steam 124 was correctly dismissed as not being a solid object, if detection 130 generated by the primary perception component 110 identified the dimensions of object 134 as being larger than the dimensions actually are, this could also cause a false positive activation of the safety component 114 in an example where the safety component 114 receives input from the primary perception component 110. In yet another example of a manner in which a prediction component of the safety component 114 may generate a false positive detection, the safety component 114 may predict a future position, heading, velocity, acceleration, and/or the like incorrectly or inaccurately. This may result in a false positive activation of the safety component 114. In additional or alternate examples, the safety component 114 may operate independently of the primary perception component 110 (i.e., without receiving input from the primary perception component 110).

Regardless of which component is responsible for the false detection, the false positive detection 126 may cause the safety component 114 to be activated, preventing trajectory 118 from being implemented since it would bring the vehicle 102 within a threshold distance of the false positive detection 126 and/or causing the vehicle 102 to make an alternate maneuver. This activation may be characterized as a false positive activation of the safety system since the vehicle 102 would not have collided with an object if the safety system had passed the trajectory 118 instead of activating.

In some examples, the controller(s) 116 may comprise software and/or hardware for actuating drive components of the vehicle 102 sufficient to track the trajectory 118. For example, the controller(s) 116 may comprise one or more proportional-integral-derivative (PID) controllers.

Example System

Figure 2:
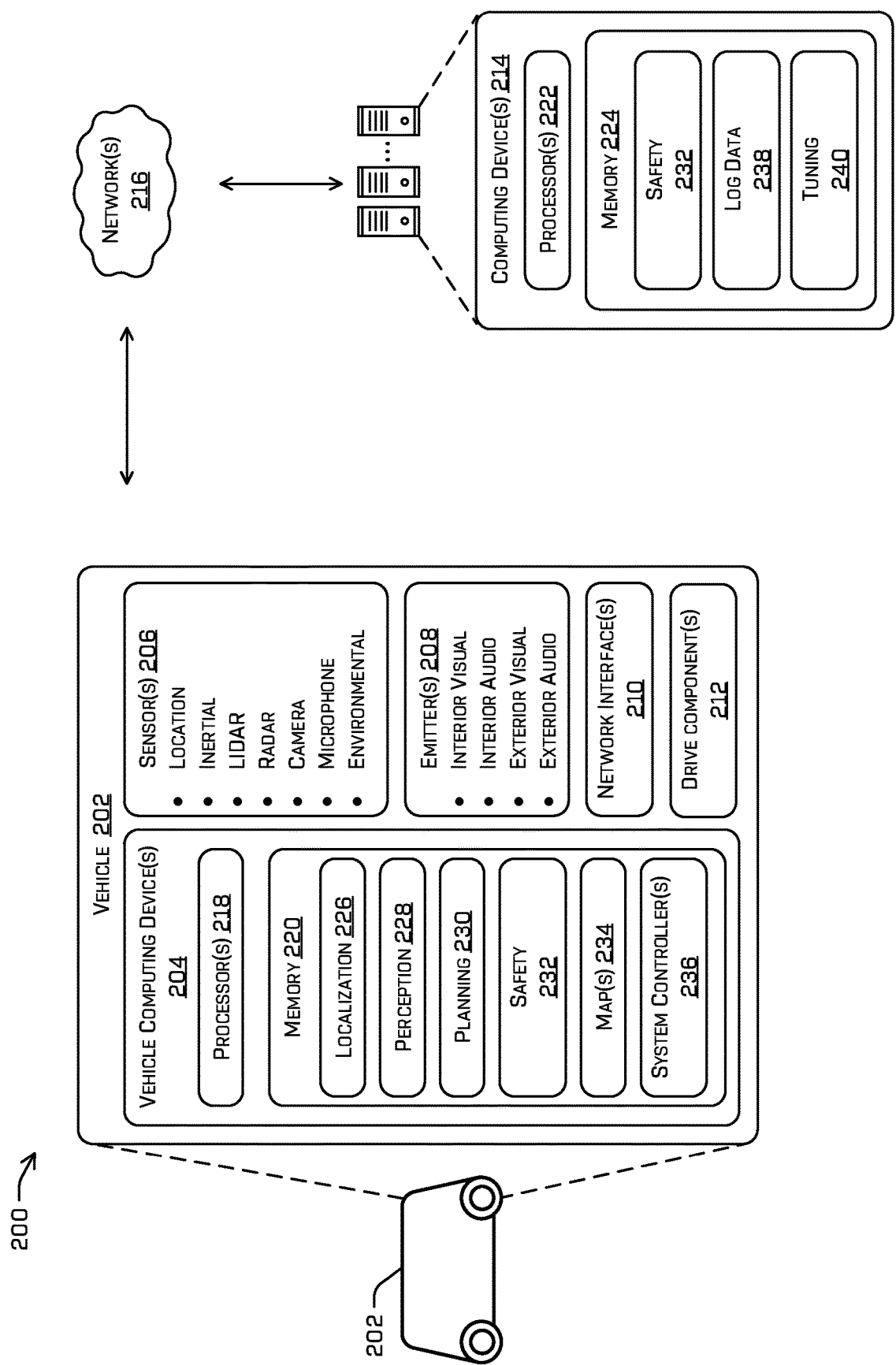
FIG. 2 illustrates a block diagram of an example system comprising a safety component.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, safety component 232, map(s) 234, and/or system controller(s) 236. Perception component 228 may represent perception component 110, planning component 230 may represent planning component 112, and/or safety component 232 may represent safety component 114.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) 234 of an environment and can continuously determine a location, velocity, and/or orientation of the autonomous vehicle within the map(s) 234. In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the safety component 232, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

The safety component 232 may operate on the vehicle 202 and/or on the computing device(s) 214. In some examples, the safety component 232 may be downstream (receive an output) from the planning component 230 in a pipeline. The safety component 232 may be configured to pass all, part, or none of the output of the planning component 230, depending on the determinations discussed herein, to system controller(s) 236 for implementation. In some examples, the safety component 232 may comprise a feedback loop for providing input to the planning component 230, such as a flag or message that triggers re-determination of a trajectory.

In some examples, the vehicle 202 may transmit log data 238 to computing device 214. The log data 238 may comprise any of the data collected, received, and/or generated by the vehicle 202. For example, log data 238 may comprise sensor data, localization data (which may be part of the perception data) generated by the localization component 226, perception data generated by the perception component 28, trajectories and/or other instructions generated by the planning component 230, determinations to pass a trajectory or to activate an alternate maneuver by the safety component 232, maps(s) 234 generated by the vehicle, error(s) and/or log(s) generated by any individual component(s), and/or the like.

In some examples, the computing device(s) 214 may additionally or alternatively comprise a tuning component 240 that may detect near-collision events based at least in part on the log data, identify component(s) responsible for a near-collision, and/or modify parameter(s) of any of the components of the vehicle. For example, the tuning component 240 may cause additional training of an ML model associated with the safety component 232, perception component 228, and/or planning component 230 or any other component(s) and/or change other parameter(s) associated therewith, such as any of a variety of thresholds, gains, dampening constants, or the like used by any of the components during operation of the vehicle. These parameter(s) may be different depending on the environment and/or object(s) detected by the perception component 228 and/or based at least in part on sensor data. The parameter(s) may therefore be stored as part of a data structure transmitted to the vehicle 202 from computing device(s) 214. The data structure may define conditional changes to the parameter(s) based at least in part on sensor data and/or perception data.

The memory 220 and/or 224 may additionally or alternatively store a mapping system (e.g., generating a map based at least in part on sensor data), a planning system, a ride management system, etc. Although localization component 226, perception component 228, planning component 230, safety component 232, map(s) 234, and/or system controller(s) 236 are illustrated as being stored in memory 220, any of these components may include processor-executable instructions, machine-learned model(s) (e.g., a neural network), and/or hardware and all or part of any of these components may be stored on memory 224 or configured as part of computing device(s) 214.

As described herein, the localization component 226, the perception component 228, the planning component 230, safety component 232, and/or other components of the system 200 may comprise one or more ML models. For example, the localization component 226, the perception component 228, the planning component 230, and/or the safety component 232 may each comprise different ML model pipelines. In at least one example, any of these components may comprise multiple models each receiving differing input and providing an associated output and/or one or more models having multiple heads. In at least some examples in which multiple output heads are used, the model may improve output associated with one sensor modality based on parameters of a shared portion of the model learn from various other sensor modalities.

In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228, which the safety component 232 may validate and/or transmit to the system controller(s) 236. The system controller(s) 236 may control operation of the vehicle 202 based at least in part on the instructions received from the planning component 230 and/or safety component 232. In some examples, the safety component 232 may replace instructions generated by the planning component 230 with a contingent trajectory associated with an alternate maneuver such as, for example, a safe stop maneuver, emergency braking, slowing the vehicle, and/or the like.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Representation of Regions Monitored by Various Components

Figure 3:
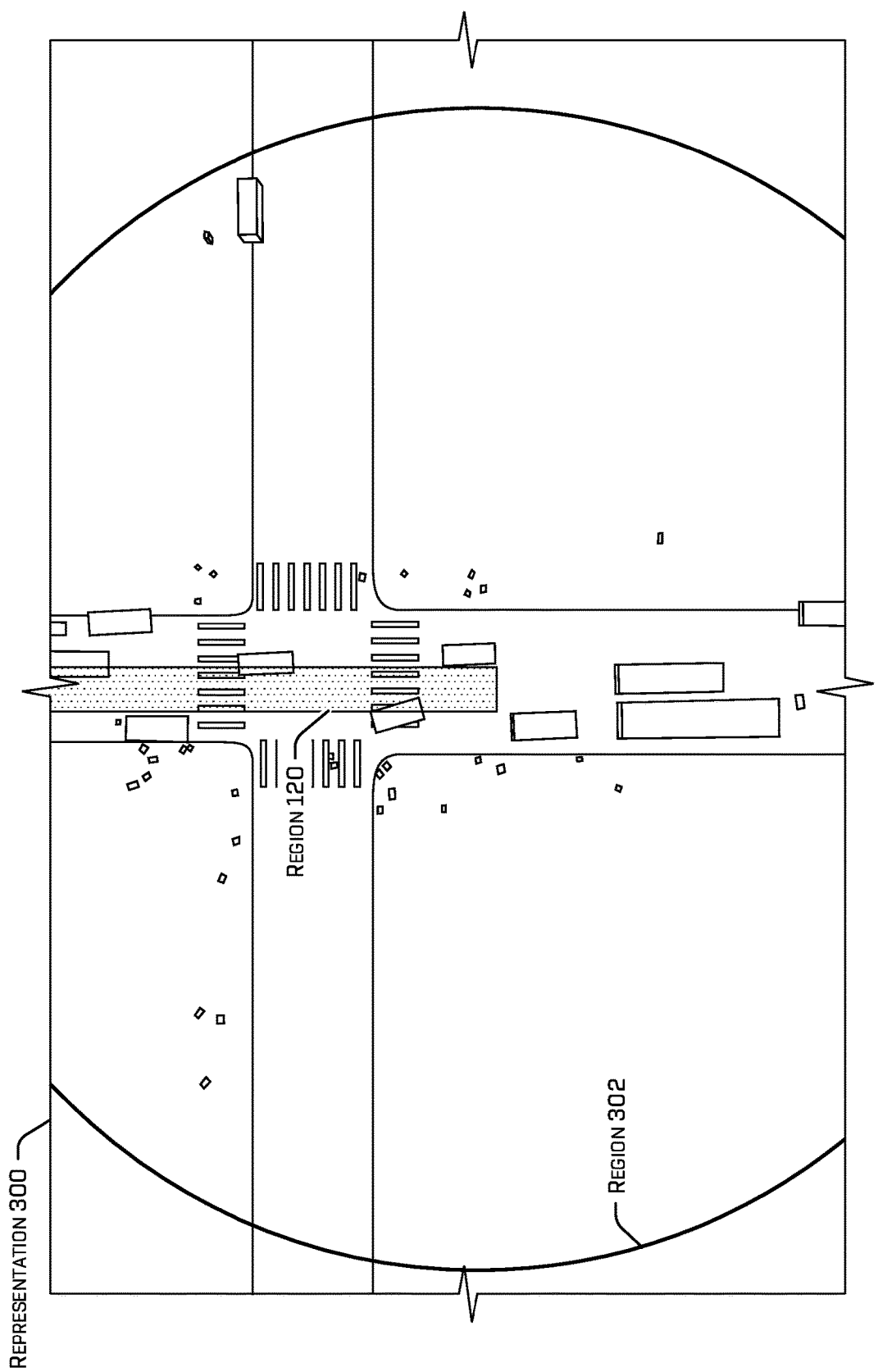
FIG. 3 illustrates a top-down representation of a region monitored by a primary perception system and a corridor monitored by a safety component.

FIG. 3 illustrates a top-down representation 300 of the sensor data representation 122 of example scenario 100 and the region 120 monitored by the safety component compared to an additional or alternative safety system monitoring region 302. Sensor data within region 302, represented as a circle, may be monitored by an additional or alternative safety system. In an additional or alternate example, region 302 may identify a distance from the vehicle 102 monitored by the primary perception component 110. In such an example, the region 302 may correspond to a maximal effective range of one or more types of the sensor(s) 104.

Example Process

Figure 4:
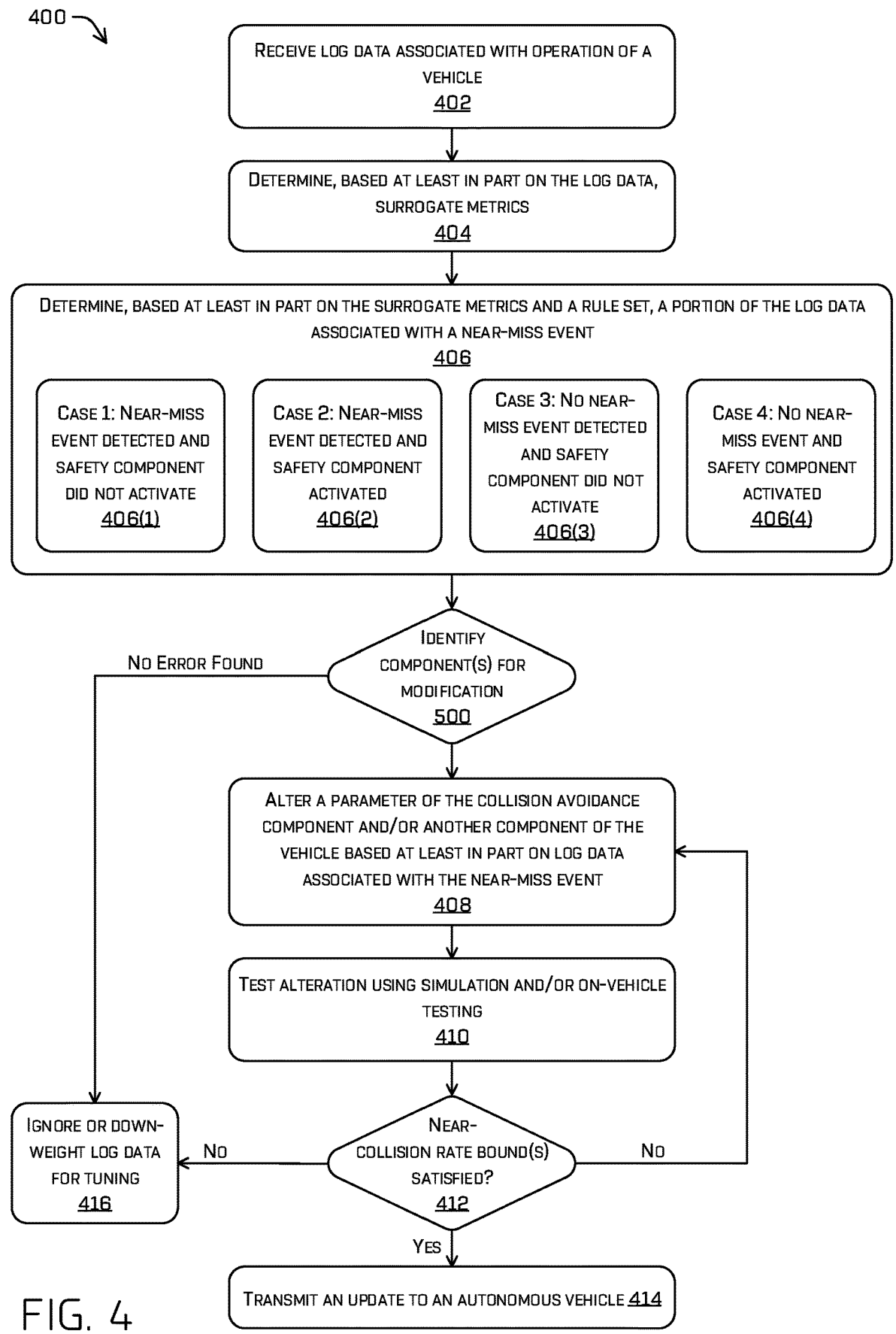
FIG. 4 illustrates a flow diagram of an example process for tuning a safety component using log data associated with a near-collision detected based at least in part on surrogate metrics.

FIG. 4 illustrates a flow diagram of an example process 400 for tuning a safety component and/or other component(s) of a vehicle using log data associated with a near-collision detected based at least in part on surrogate metrics.

At operation 402, example process 400 may comprise receiving log data associated with operation of one or more vehicles, according to any of the techniques discussed herein. For example, the log data may comprise at least sensor data, which may comprise LIDAR data, radar data, infrared image data, visual image data, sonar data, and/or the like; perception data; and/or collision avoidance data indicating determinations and/or operations accomplished by the safety component. In some examples, the log data may be received from a simulated or real-world operation of the component(s) of the vehicle. To reduce the amount of data, in at least one example, the log data may be sampled (e.g., sample every 0.2 seconds, sample every 1 second, sample every 0.01 seconds, any other sample rate with sufficient granularity).

At operation 404, example process 400 may comprise determining, based at least in part on the log data, surrogate metrics, according to any of the techniques discussed herein. In some examples, the surrogate metrics may or may not be part of the perception data or another part of the log data. In an example where a surrogate metric is determined by a sensor or the perception component, operation 404 may comprise extracting the surrogate metric from the log data. In some examples, the surrogate metrics determined may be based at least in part on the object types detected (e.g., lateral distance may be calculated for pedestrians but not for vehicles in one example, although in another example, the surrogate lateral distance may be calculated for both). The surrogate metric(s) may comprise any of the following:

encroachment time (e.g., time period during which an object enters the vehicle's right of way),
gap time (e.g. time period between completion of encroachment by an object and the arrival time of vehicle if they continue with the same speed and path),
post-encroachment time (e.g., a time period between the end of an encroachment and the time that the vehicle arrives at the point that would have resulted in a collision),
initially-attempted post encroachment time (e.g., time period between the beginning of an encroachment plus the encroachment time and the expected time for the vehicle to reach the point of collision),
deceleration rate required to avoid a collision with an object,
a stopping distance required before colliding with an object,
a proportion between the remaining distance to the predicted point of collision to the minimum stopping distance as defined by a threshold distance,
time to collision (e.g., a predicted time before the vehicle collides with an object if they maintain their present speed and/or path),
a lateral distance to a closest object,
a longitudinal and/or lateral acceleration (whether acceleration or deceleration), and/or
a longitudinal and/or lateral jerk.

At operation 406, example process 400 may comprise determining, based at least in part on the surrogate metrics and a rule set, a portion of the log data associated with a near-collision event, according to any of the techniques discussed herein. In some examples, operation 406 may comprise identifying a candidate time or time range that may be associated with a near-collision event based at least in part on surrogate metrics that satisfy at least part of the rule set. For example, the rule set may filter the log data to identify log data associated with a distance to a nearest object that is less than a threshold, metric(s) associated with evasive maneuvers (e.g., an acceleration/deceleration of 3.0 meters per second-squared or more, as one example, although other thresholds are contemplated; a change to the trajectory that occurs in less than one second; a jerk equal to or greater than one meter per second-cubed), an indication that the safety system did not actuate. Put alternately, the rule set may be configured such that the filtering identifies situations in which a single point of failure of any system of the autonomous vehicle would have resulted in a collision.

In at least one example, the rule set may comprise log data state conditions, threshold(s), and/or the like to indicate a definition of near-collision. For example, the rule set may be configured to identify log data associated with an event where the vehicle did not collide with an object (e.g., collision state may be identified by perception and/or sensor data), evasion was required by the vehicle and/or the object (e.g., as quantified by steering instructions/steering angle and/or angle rate threshold(s), braking state and/or threshold(s), acceleration threshold(s)), and/or a rapidity of the vehicle's response given the amount of time from the beginning of the vehicle's reaction and the potential time to impact (e.g., as quantified by jerk threshold(s)). By identifying near-collisions where the safety system was not activated (i.e., case 1, indicated at 406(1) in FIG. 4), this is a situation where an activation by the safety system would have been a false positive since the situation did not result in a collision and this data may be used to tune the component(s) of the autonomous vehicle to alter the false positive rate. The log data associated with this situation thereby provides the means by which to make meaningful improvements to the safety component and/or other systems. Additionally or alternatively, the rule set my identify situations in which the safety system was activated.

In some examples, the rule set may be used to exclude log data associated with cases 2 and/or 3 from use in tuning the pipeline(s). Case 2 may be a set of rules for detecting scenarios that may be true positives, i.e., where a near-miss event was detected and the safety component activated, indicated as 406(2). Case 3 may be a set of rules for detecting normative operation, i.e., where no near-miss event is detected and the safety system did not activate, indicated as 406(3).

In some examples, the techniques may additionally or alternatively comprise identifying scenarios in which a near-collision was not detected and the safety system was activated (i.e., case 4 indicated at 406(4) in FIG. 4). This may be an instance in which a false positive occurred, although this is not always the case. Log data associated with situations in which the safety system was activated may be down-weighted in its effect on the modification to the component(s) since it may be difficult to determine whether a collision would have happened or not without the activation of the safety system.

In some examples, determining the portion of log data associated with a near-collision event may comprise inputting at least part of the surrogate metrics to an ML model trained to identify near-collision events. Operation 406 may additionally or alternatively comprise determining an importance associated with the near-collision event. In some examples, determining the importance associated with a near-collision event may be based at least in part on determining whether the near-collision event was caused by an error or other inaccuracy associated with one or more components of the vehicle, as discussed in more detail regarding FIG. 5. The importance may be used to weight modifications made to a component of the vehicle based at least in part on the near-collision event—the greater the importance, the greater the weight and the greater the modification.

Example process 400 may comprise operation 500, which is explained in more detail below. Operation 500 may comprise determining component(s) for modification based at least in part on log data associated with the near-collision event, according to any of the techniques discussed herein. If no component and/or error is identified by operation 500, example process 400 may continue to operation 416 for that particular log data and/or operation 406 to determine another near-collision event, if one exists.

At operation 408, example process 400 may comprise altering a parameter of the safety component and/or another component of the vehicle based at least in part on log data associated with the near collision event, according to any of the techniques discussed herein. For example, altering a parameter of the safety component may comprise altering a minimum distance and/or time gap between the autonomous vehicle and a detected object before triggering the safety component, a maximum positive or negative acceleration of the vehicle, an assumption or prediction of another object's ability to stop or modify behavior, etc., any of which may directly affect the likelihood of a false positive activation of the safety component. In yet an additional or alternate example, the safety component may generate a top-down representation of the environment and indications of portions of the environment that are occupied by an object. Determining the top-down representation may comprise aggregating multiple occupancy maps generated by different pipelines (e.g., associated with different types of sensors in some examples) and associated with a same time into a single occupancy map. For example, operation 408 may comprise aggregating a first occupancy map output by a first ML model and associated with a first time and a second occupancy map output by a second ML model and associated with the first time into a first aggregated occupancy map, and so on for subsequent time steps for which occupancy maps are determined by the different pipelines. Ultimately, the aggregating combines occupancy maps from different pipelines and associated with a same time into a single occupancy map. The data structure may comprise these aggregated occupancy maps at different time steps.

In some examples, aggregating the occupancy maps may comprise an ensemble voting technique such as, for example, majority voting, plurality voting, weighted voting (e.g., where certain pipelines are attributed more votes, functionally) and/or an averaging technique such as simple averaging, weighted averaging, and/or the like. In other words, a first occupancy map may indicate that there is a 0.9 likelihood that a portion of the environment is occupied and a second occupancy map may indicate that there is a 0.8 likelihood that the portion is occupied. The techniques may comprise using the likelihoods in a voting technique to determine whether to indicate that the portion is occupied or unoccupied and/or averaging the likelihoods to associate an averaged likelihood therewith.

Operation 408 may comprise tuning parameters associated with the voting technique or selecting from among different voting ensemble techniques. For example, aggregating the occupancy maps may comprise applying a threshold to a likelihood of whether a discrete space is occupied to determine binary indications of whether a portion is occupied or unoccupied, according to any of the techniques discussed herein. The threshold may be a threshold confidence score. The threshold may be different per pipeline in examples where the threshold is applied to occupancy maps before aggregating. In some examples, applying the threshold may comprise indicating that any portion of an occupancy map that indicates a confidence score below the threshold is unoccupied and any portion that meets or exceeds the threshold confidence score is occupied, or vice versa depending on the meaning of the score (e.g., where 0 indicates that the environment portion is occupied). In an additional or alternate example, different thresholds may be associated with different pipelines—a score that meets or exceeds 0.8 may indicate occupancy for a first pipeline, a score that meets or exceeds 0.7 may indicate occupancy for a second pipeline, and so on.

In some examples, operation 408 may comprise adjusting threshold(s) associated with one or more of the pipelines to decrease the number of near-collisions. In other words, the threshold(s) or parameters with the voting may be altered so that a near-collision event would not have been a near-collision event and/or so that the collision avoidance system would activate based on a true positive detection. The threshold may be set and/or the voting technique may be chosen based at least in part on a target false negative rate. For example, a unanimous voting technique may result in lower false negative rate and a higher false positive rate, whereas a plurality voting technique may result in a higher false negative rate and a lower false positive rate. Similarly, a higher threshold may result in a lower false negative rate and a higher false positive rate, and vice versa for a lower threshold. In some examples, setting a threshold may comprise training the ML models based at least in part on a training data set, which may include sensor data recorded from live operation of a vehicle and/or simulated sensor data, top-down representations generated by a previously-trained ML model, aerial footage, and/or labels generated by humans and/or another ML model; and/or operating the ML models using test data, which may comprise additional sensor data, at different thresholds. A threshold may be chosen that is associated with an upper bound on a rate of near-collision events and/or a lower bound on a rate or near-collision events.

At operation 410, example process 410 may comprise testing the alteration using simulation and/or on-vehicle testing, according to any of the techniques discussed herein. For example, operation 410 may comprise replacing original component(s) with any component(s) that were altered by operation 408 and re-running at least part of the log data through the pipeline, including the replaced component(s). Additionally or alternatively, the component(s) may be tested using simulated sensor data according to a synthetic environment and objects generated by a simulation component. Regardless, operation 410 may comprise tracking the number and/or rate of near-collision events for the original component(s) and/or for the updated pipeline with the replaced component(s).

At operation 412, example process 400 may comprise determining whether the near-collision rate bound(s) are satisfied based at least in part on operation of the altered component(s), according to any of the techniques discussed herein. For example, operation 412 may comprise determining whether the near-collision rate associated with the altered component(s) decreases compared to the original component(s) and/or whether the near-collision rate meets or exceeds a lower threshold and/or does not exceed an upper threshold. If the near-collision rate satisfies the bound(s), example process 400 may continue to operation 414; otherwise, example process 400 may return to operation 408 and/or operation 410 or example process 400 may continue to operation 416.

Decreasing the near-collision rate may increase the false positive rate and increasing the near-collision rate may decrease the false positive rate. In some examples, example process 400 may additionally or alternatively comprise determining the upper threshold and the lower threshold based at least in part on a target false positive rate per miles driven and/or a target near-collision rate per miles driven by the autonomous vehicle. In some examples, the bounds may be based at least in part on a location of the autonomous vehicle, time of day, day of the week, date, etc. to account for traffic variations that may contribute to the need to tolerate some near-collisions in order to navigate efficiently (e.g., rush hour in downtown New York City versus 2 am in a quiet suburb).

At operation 414, example process 400 may comprise transmitting an update to an autonomous vehicle based at least in part on the alteration, wherein the update is configured to control the autonomous vehicle, at least in part. For example, the update may comprise an updated version of the safety component or another component (at least a software portion thereof) according to the alteration(s) made at operation 408. In some examples, the updated parameter(s) may be transmitted with instructions to implement the updated parameter(s). The updated parameter(s) may be associated with sensor data and/or perception data conditions that trigger use of the updated parameter(s), in some cases. For example, if the vehicle detects that the vehicle is operating in a residential neighborhood, the vehicle may use safety component parameters that were generated without a lower threshold for near-collision events (e.g., the parameters were generated to reduce the near-collision events as much as possible without introducing any false negatives). Whereas, if the vehicle detects that the vehicle is operating in a busy downtown region, the vehicle may use other safety component parameters generated using a lower threshold for near-collision events to permit a small amount of near-collisions in order to efficiently navigate that environment.

At operation 416, example process 400 may comprise ignoring or down-weighting log data associated with a detected near-collision event, according to any of the techniques discussed herein. For example, if using a particular portion of log data associated with the near-collision event to alter a component did not result in a change or a large enough change (e.g., a change meeting or exceeding a threshold) in the near-collision event rate or the near-collision event, the near-collision event may not have been associated with an error of any of the components of the autonomous vehicle. Additionally or alternatively, the penalty or other adjustment that is based at least in part on the near-collision event may be down-weighted so that such a near-collision event doesn't strongly influence the alteration of the component.

Figure 5:
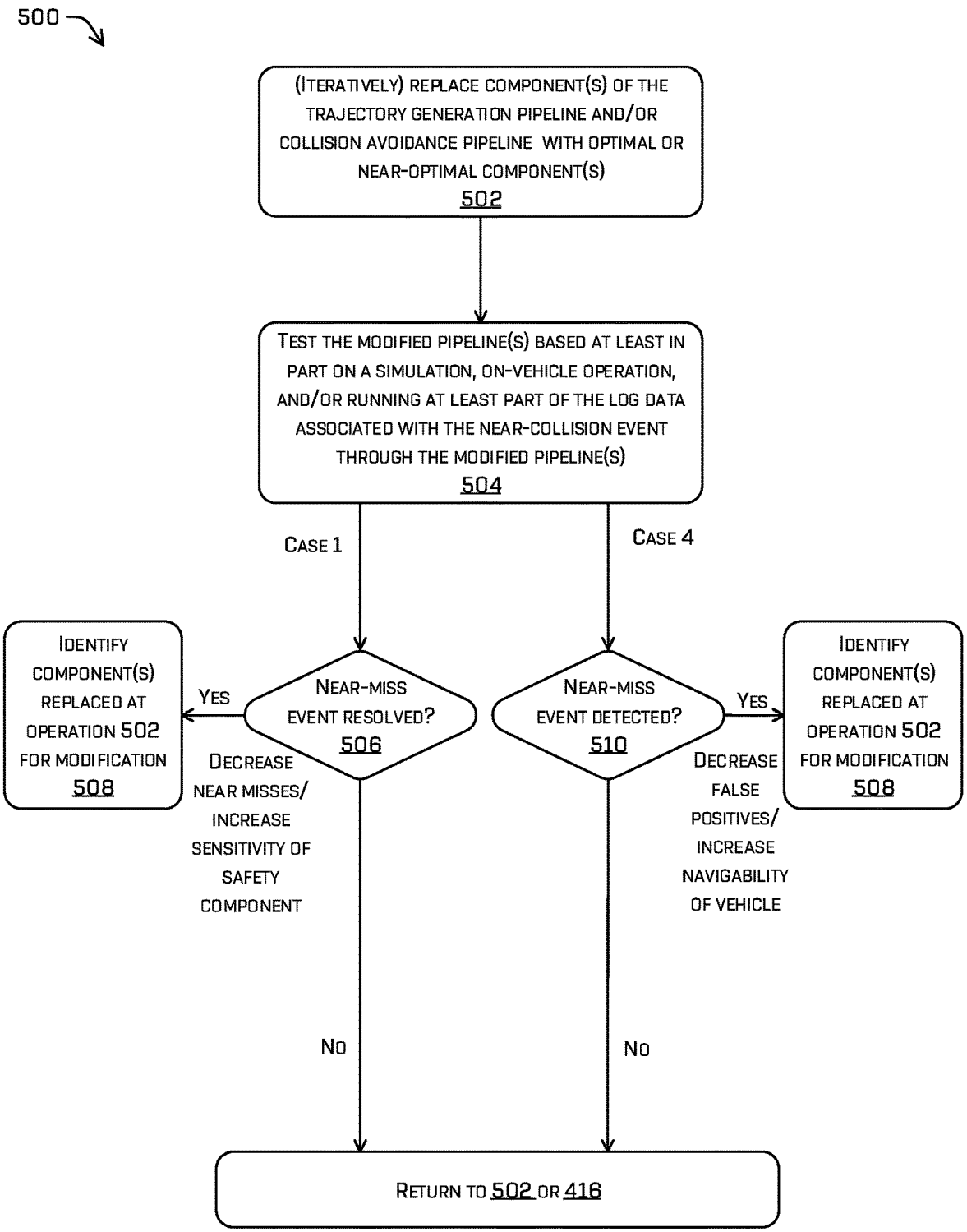
FIG. 5 illustrates a flow diagram of an example process for determining component(s) to be modified based at least in part on log data associated with a near-collision event.

FIG. 5 illustrates a flow diagram of an example process 500 for determining component(s) for modification based at least in part on log data associated with the near-collision event. In some examples, example process 500 may be triggered based at least in part on a near-collision event being identified according to example process 400.

At operation 502, example process 500 may comprise replacing one or more components of the trajectory generation pipeline and/or collision avoidance pipeline with an optimal or near-optimal component (e.g., replacing a functional component with ground truth data or by using a component that uses hardware or algorithms that might not be available on-vehicle due to computation time, computational availability/hardware, and/or storage constraints, for example), according to any of the techniques discussed herein. The replacement may occur in a simulation or a real-world operation and may result in a modified pipeline.

At operation 504, example process 500 may comprise testing the modified pipeline(s) based at least in part on a simulation and/or an on-vehicle operation. In at least some examples, operation 504 may include pushing at least part of the log data associated with the near-collision event through the modified pipeline(s). In some examples, operation 504 may additionally or alternatively comprise recording a result of the test and/or comparing the result to the log data. The comparison may comprise determining whether the safety component activated and whether a near-collision event is detected, using the near-collision rule set.

At operation 506, for at least case 1 and/or case 2 (i.e., where a near-collision event was detected) example process 500 may comprise determining whether the test of the modified pipeline resulted in a resolution of the near-collision event, i.e., where no near-collision event was detected for the test at operation 504 of the modified pipeline. If the replacement resolved the near-miss, example process 500 may transition to operation 508. Additionally or alternatively, operation 506 may comprise determining that the near-collision event was resolved and that the safety system actuated when it formerly hadn't, thereby potentially introducing a false positive, which may be tolerated in situations where the near-collision threshold needs to be reduced, i.e., when it is desirable that the system be more sensitive. In an example where the near-collision rate was supposed to increase (e.g., the near-collision rate does not meet a lower near-collision rate threshold) to further suppress false positives but operation 506 detects a near-miss event, process 500 may return to operation 502 or, after exhausting a set number of attempts at returning to operation 502, process 500 may transition to operation 416, thereby down-weighting or discarding the log data associated with the scenario since it proved ineffective to be useful for modifying the pipeline.

At operation 508, example process 500 may identify the component(s) replaced at operation 502 for modification, according to any of the techniques discussed herein. For example, this may trigger additional or new training of the component, alteration of parameter(s) of the component, and/or the like. Operation 508 may comprise operation 408.

At operation 510, for case 4 (i.e., when the safety system actuated but no near-miss was detected), example process 500 may comprise determining whether a near-miss event was newly detected upon testing, thereby removing a false positive and introducing a near-miss event. In an example where the near-miss rate is below a lower threshold, example process 500 may transition to operation 508. In such an example, the replacement/modification caused by operation 508 may reduce the false positive rate. However, in an alternate example where the near-miss rate exceeds an upper threshold (i.e., the objective is to drive the near-miss rate down and increase the sensitivity of the safety component, thereby potentially introducing some false positives), example process 500 may return to operation 502 or transition to operation 416 if a threshold number of attempts at returning to operation 502 to attempt modifying different components have failed.

Example Clauses

A. A method comprising: receiving sensor data associated with operation of a safety component of an autonomous vehicle; determining, based at least in part on the sensor data, a representative metric associated with operation of the autonomous vehicle; determining, based at least in part on the representative metric, that at least a portion of the operation is associated with a near-miss event; and altering a parameter of the at least one of the safety component or another component of the autonomous vehicle based at least in part on the near-collision event to determine an updated component, wherein the altering: decreases a near-miss rate below an upper near-miss threshold and increases a false positive rate, or increases the near-miss rate to meet or exceed a lower near-miss target and decreases the false positive rate.

B. The method of paragraph A, further comprising: determining the upper near-miss threshold based at least in part on a first near-miss count or false positive count per miles driven; and determining the lower near-miss threshold based at least in part on a second near-miss count per miles driven, wherein the second near-miss count per miles driven is less than the first near-miss count per miles driven.

C. The method of either paragraph A or B, wherein the representative metric comprises one or more of: an encroachment time, a gap time, a deceleration rate to avoid a collision with an object, a stopping distance required before colliding with an object, a proportion between a remaining distance to a predicted point of collision to a minimum stopping distance, a time to collision, a lateral distance to a closest object, a longitudinal acceleration, or a longitudinal and/or lateral jerk.

D. The method of any one of paragraphs A-C, wherein the altering comprises altering at least one of: a minimum distance between the autonomous vehicle and a detected object; a period of time in which the autonomous vehicle is predicted to reach a position of the detected object; a maximum acceleration associated with operation of the vehicle; or a prediction or heuristic of an object's ability to stop or modify the object's behavior.

E. The method of any one of paragraphs A-D further comprising: determining, based at least in part on the sensor data, an additional representative metric associated with the operation of the autonomous vehicle; determining, based at least in part on the additional representative metric, that at least a second portion of the operation is associated with normative operation; determining that the safety component activated during the second portion of the operation; and altering a second parameter of the at least one of the safety component or another component of the autonomous vehicle to determine a second updated component based at least in part on determining that the second portion is associated with normative operation and that the safety component activated.

F. The method of any one of paragraphs A-E, wherein, upon simulating or operating the autonomous vehicle in a same or similar scenario to a scenario associated with the second portion of the operation, altering the second parameter causes the safety component to abstain from activating, resulting in a second near-miss event.

G. A system comprising: one or more processors; and a memory storing processor-executable instructions that, when executed by the one or more processors, cause the system to perform operations comprising: receiving sensor data associated with operation of a safety component of an autonomous vehicle; determining, based at least in part on the sensor data, one or more characteristics of operation of the autonomous vehicle; determining, based at least in part on the one or more characteristics, that at least a portion of the operation is associated with a near-miss event; and altering a parameter of the at least one of the safety component or another component of the autonomous vehicle based at least in part on the near-collision event to determine an updated component.

H. The system of paragraph G, wherein the altering: decreases a near-miss rate below an upper near-miss threshold and increases a false positive rate, or increases the near-miss rate to meet or exceed a lower near-miss target and decreases the false positive rate.

I. The system of either paragraph G or H, wherein the operations further comprise: determining the upper near-miss threshold based at least in part on a first near-miss count or false positive count per miles driven; and determining the lower near-miss threshold based at least in part on a second near-miss count per miles driven, wherein the second near-miss count per miles driven is less than the first near-miss count per miles driven.

J. The system of any one of paragraphs G-I, wherein altering the parameter based at least in part on the near-collision event is further based at least in part on a near-collision event count and further comprises determining that the safety component remained inactive.

K. The system of any one of paragraphs G-J, wherein the altering comprises altering at least one of: a minimum distance between the autonomous vehicle and a detected object; a period of time in which the autonomous vehicle is predicted to reach a position of the detected object; a maximum acceleration associated with operation of the vehicle; or a prediction or heuristic of an object's ability to stop or modify the object's behavior.

L. The system of any one of paragraphs G-K, wherein the operations further comprise: determining, based at least in part on the sensor data, one or more second characteristics associated with the operation of the autonomous vehicle; determining, based at least in part on the one or more second characteristics, that at least a second portion of the operation is associated with normative operation; determining that the safety component activated during the second portion of the operation; and altering a second parameter of the at least one of the safety component or another component of the autonomous vehicle to determine a second updated component based at least in part on determining that the second portion is associated with normative operation and that the safety component activated.

M. The system of any one of paragraphs G—L, wherein, upon simulating or operating the autonomous vehicle in a same or similar scenario to a scenario associated with the second portion of the operation, altering the second parameter causes the safety component to abstain from activating, resulting in a second near-miss event.

N. A non-transitory computer-readable medium storing processor-executable instructions that, when executed by one or more processors, cause the one or more processors to perform operations comprising: receiving sensor data associated with operation of a safety component of an autonomous vehicle; determining, based at least in part on the sensor data, one or more characteristics of operation of the autonomous vehicle; determining, based at least in part on the one or more characteristics, that at least a portion of the operation is associated with a near-miss event; and altering a parameter of the at least one of the safety component or another component of the autonomous vehicle based at least in part on the near-collision event to determine an updated component.

O. The non-transitory computer-readable medium of paragraph N, wherein the altering: decreases a near-miss rate below an upper near-miss threshold and increases a false positive rate, or increases the near-miss rate to meet or exceed a lower near-miss target and decreases the false positive rate.

P. The non-transitory computer-readable medium of either paragraph N or O, wherein the operations further comprise: determining the upper near-miss threshold based at least in part on a first near-miss count or false positive count per miles driven; and determining the lower near-miss threshold based at least in part on a second near-miss count per miles driven, wherein the second near-miss count per miles driven is less than the first near-miss count per miles driven.

Q. The non-transitory computer-readable medium of any one of paragraphs N—P, wherein altering the parameter based at least in part on the near-collision event is further based at least in part on a near-collision event count and further comprises determining that the safety component withheld activation.

R. The non-transitory computer-readable medium of any one of paragraphs N-Q, the altering comprises altering at least one of: a minimum distance between the autonomous vehicle and a detected object; a period of time in which the autonomous vehicle is predicted to reach a position of the detected object; a maximum acceleration associated with operation of the vehicle; or a prediction or heuristic of an object's ability to stop or modify the object's behavior.

S. The non-transitory computer-readable medium of any one of paragraphs N-R, wherein the operations further comprise: determining, based at least in part on the sensor data, one or more second characteristics associated with the operation of the autonomous vehicle; determining, based at least in part on the one or more second characteristics, that at least a second portion of the operation is associated with normative operation; determining that the safety component activated during the second portion of the operation; and altering a second parameter of the at least one of the safety component or another component of the autonomous vehicle to determine a second updated component based at least in part on determining that the second portion is associated with normative operation and that the safety component activated.

T. The non-transitory computer-readable medium of any one of paragraphs N-S, wherein, upon simulating or operating the autonomous vehicle in a same or similar scenario to a scenario associated with the second portion of the operation, altering the second parameter causes the safety component to abstain from activating, resulting in a second near-miss event.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving sensor data associated with operation of a safety component of an autonomous vehicle;
   determining, based at least in part on the sensor data, a representative metric associated with operation of the autonomous vehicle;
   determining, based at least in part on the representative metric, that at least a portion of the operation is associated with a near-miss event, wherein the near-miss event indicates that the autonomous vehicle passed within a threshold distance of an object;
   altering a parameter of one or more of the safety component or another component of the autonomous vehicle based at least in part on the near-miss event to determine an updated component, wherein the altering:
      is based at least in part on a near-miss event count and further comprises determining that the safety component remained inactive; and
      decreases a near-miss rate below an upper near-miss threshold and increases a false positive rate, or
      increases the near-miss rate to meet or exceed a lower near-miss threshold and decreases the false positive rate; and
   transmitting the altered parameter to the autonomous vehicle, such that the autonomous vehicle controls operations of the autonomous vehicle based at least in part on the altered parameter.

2. The method of claim 1, further comprising:
   determining the upper near-miss threshold based at least in part on a first near-miss count or false positive count per miles driven; and
   determining the lower near-miss threshold based at least in part on a second near-miss count per miles driven, wherein the second near-miss count per miles driven is less than the first near-miss count per miles driven.

3. The method of claim 1, wherein the representative metric comprises one or more of:
   an encroachment time,
   a gap time,
   a deceleration rate to avoid a collision with an object,
   a stopping distance required before colliding with an object,
   a proportion between a remaining distance to a predicted point of collision to a minimum stopping distance,
   a time to collision,
   a lateral distance to a closest object,
   a longitudinal acceleration, or
   a longitudinal and/or lateral jerk.

4. The method of claim 1, wherein the altering comprises altering one or more of:
   a minimum distance between the autonomous vehicle and a detected object;
   a period of time in which the autonomous vehicle is predicted to reach a position of the detected object;
   a maximum acceleration associated with operation of the vehicle; or
   a prediction or heuristic of an object's ability to stop or modify the object's behavior.

5. The method of claim 1 further comprising:
   determining, based at least in part on the sensor data, an additional representative metric associated with the operation of the autonomous vehicle;
   determining, based at least in part on the additional representative metric, that at least a second portion of the operation is associated with normative operation;
   determining that the safety component activated during the second portion of the operation; and
   altering a second parameter of the one or more of the safety component or another component of the autonomous vehicle to determine a second updated component based at least in part on determining that the second portion is associated with normative operation and that the safety component activated.

6. The method of claim 5, wherein, upon simulating or operating the autonomous vehicle in a same or similar scenario to a scenario associated with the second portion of the operation, altering the second parameter causes the safety component to abstain from activating, resulting in a second near-miss event.

7. A system comprising:
   one or more processors; and
   a memory storing processor-executable instructions that, when executed by the one or more processors, cause the system to perform operations comprising:
   receiving sensor data associated with operation of a safety component of an autonomous vehicle;
   determining, based at least in part on the sensor data, one or more characteristics of operation of the autonomous vehicle;
   determining, based at least in part on the one or more characteristics, that at least a portion of the operation is associated with a near-miss event;
   altering a parameter of the one or more of the safety component or another component of the autonomous vehicle based at least in part on the near-miss event to determine an updated component, wherein altering the parameter is based at least in part on a near-miss event count and further comprises determining that the safety component remained inactive; and
   transmitting the altered parameter to the autonomous vehicle, such that the autonomous vehicle controls operations of the autonomous vehicle based at least in part on the altered parameter.

8. The system of claim 7, wherein the altering:
   decreases a near-miss rate below an upper near-miss threshold and increases a false positive rate, or
   increases the near-miss rate to meet or exceed a lower near-miss threshold and decreases the false positive rate.

9. The system of claim 8, wherein the operations further comprise:
   determining the upper near-miss threshold based at least in part on a first near-miss count or false positive count per miles driven; and
   determining the lower near-miss threshold based at least in part on a second near-miss count per miles driven, wherein the second near-miss count per miles driven is less than the first near-miss count per miles driven.

10. The system of claim 7, wherein the altering comprises altering one or more of:

a minimum distance between the autonomous vehicle and a detected object;

a period of time in which the autonomous vehicle is predicted to reach a position of the detected object;

a maximum acceleration associated with operation of the vehicle; or a prediction or heuristic of an object's ability to stop or modify the object's behavior.

11. The system of claim 7, wherein the operations further comprise:

determining, based at least in part on the sensor data, one or more second characteristics associated with the operation of the autonomous vehicle;

determining, based at least in part on the one or more second characteristics, that at least a second portion of the operation is associated with normative operation;

determining that the safety component activated during the second portion of the operation; and altering a second parameter of the one or more of the safety component or another component of the autonomous vehicle to determine a second updated component based at least in part on determining that the second portion is associated with normative operation and that the safety component activated.

12. The system of claim 11, wherein, upon simulating or operating the autonomous vehicle in a same or similar scenario to a scenario associated with the second portion of the operation, altering the second parameter causes the safety component to abstain from activating, resulting in a second near-miss event.

13. A non-transitory computer-readable medium storing processor-executable instructions that, when executed by one or more processors, cause the one or more processors to perform operations comprising:

receiving sensor data associated with operation of a safety component of an autonomous vehicle;

determining, based at least in part on the sensor data, one or more characteristics of operation of the autonomous vehicle;

determining, based at least in part on the one or more characteristics, that at least a portion of the operation is associated with a near-miss event;

altering a parameter of the one or more of the safety component or another component of the autonomous vehicle based at least in part on the near-miss event to determine an updated component, wherein altering the parameter is further based at least in part on a near-miss event count and further comprises determining that the safety component withheld activation; and transmitting the altered parameter to the autonomous vehicle, such that the autonomous vehicle controls operations of the autonomous vehicle based at least in part on the altered parameter.

14. The non-transitory computer-readable medium of claim 13, wherein the altering:

decreases a near-miss rate below an upper near-miss threshold and increases a false positive rate, or increases the near-miss rate to meet or exceed a lower near-miss threshold target and decreases the false positive rate.

15. The non-transitory computer-readable medium of claim 14, wherein the operations further comprise:

determining the upper near-miss threshold based at least in part on a first near-miss count or false positive count per miles driven; and determining the lower near-miss threshold based at least in part on a second near-miss count per miles driven, wherein the second near-miss count per miles driven is less than the first near-miss count per miles driven.

16. The non-transitory computer-readable medium of claim 13, the altering comprises altering one or more of:

a minimum distance between the autonomous vehicle and a detected object;

a period of time in which the autonomous vehicle is predicted to reach a position of the detected object;

a maximum acceleration associated with operation of the vehicle; or a prediction or heuristic of an object's ability to stop or modify the object's behavior.

17. The non-transitory computer-readable medium of claim 13, wherein the operations further comprise:

determining, based at least in part on the sensor data, one or more second characteristics associated with the operation of the autonomous vehicle;

determining, based at least in part on the one or more second characteristics, that at least a second portion of the operation is associated with normative operation;

determining that the safety component activated during the second portion of the operation; and altering a second parameter of the one or more of the safety component or another component of the autonomous vehicle to determine a second updated component based at least in part on determining that the second portion is associated with normative operation and that the safety component activated.

18. The non-transitory computer-readable medium of claim 17, wherein, upon simulating or operating the autonomous vehicle in a same or similar scenario to a scenario associated with the second portion of the operation, altering the second parameter causes the safety component to abstain from activating, resulting in a second near-miss event.

* * * * *